H. L. SCHOLL.
CRANK AND ATTACHMENT THEREFOR.
APPLICATION FILED AUG. 27, 1918.
1,323,106.
Patented Nov. 25, 1919.
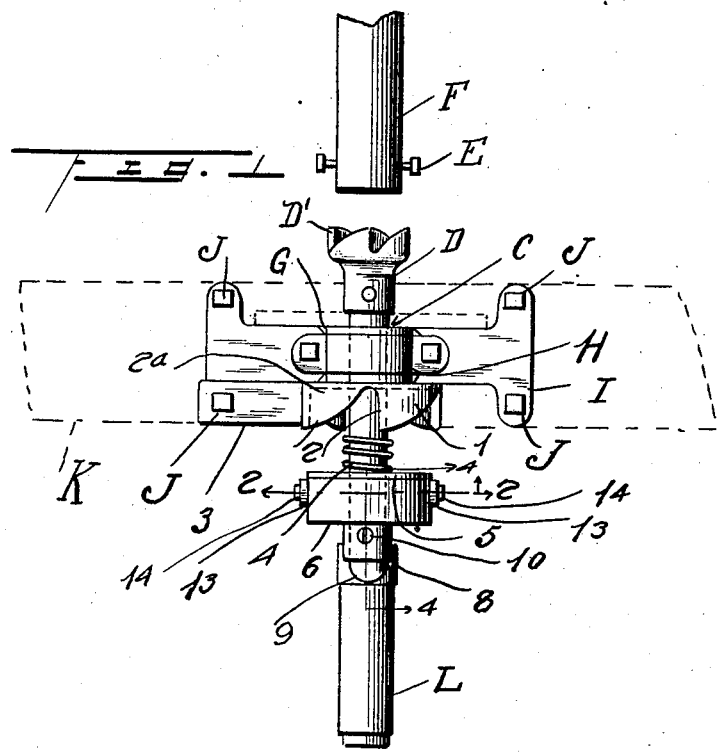
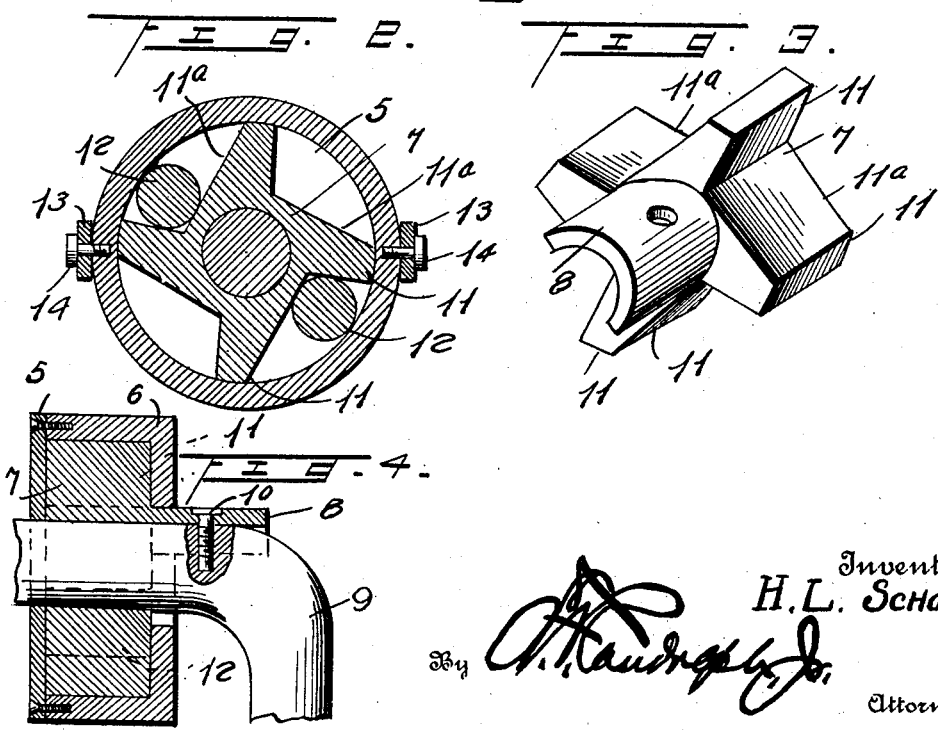
Inventor
H. L. Scholl.
Attorney

UNITED STATES PATENT OFFICE.

HENRY L. SCHOLL, OF WATERTOWN, WISCONSIN.

CRANK AND ATTACHMENT THEREFOR.

1,323,106.   Specification of Letters Patent.   Patented Nov. 25, 1919.

Application filed August 27, 1918. Serial No. 251,622.

*To all whom it may concern:*

Be it known that I, HENRY L. SCHOLL, a citizen of the United States, residing at Watertown, in the county of Jefferson and State of Wisconsin, have invented certain new and useful Improvements in Cranks and Attachments Therefor; and I do hereby declare the following to be a full, clear, and exact description of the invention, such as will enable others skilled in the art to which it appertains to make and use the same.

This invention relates to cranks and attachments therefor, and more particularly to an automobile crank and an attachment for automatically releasing the crank from the crank shaft of the engine in the event that the engine "kicks" or back-fires.

One of the main objects of the invention is to provide a crank and an attachment therefor of simple construction and operation which may be easily and readily applied and will act to move the crank into inoperative position upon reverse rotation of the same.

A further object is to provide an attachment of the character stated which may be readily applied to an automobile crank of standard construction, such as that employed in connection with the Ford automobile, without necessitating any alterations in the construction of the crank itself or of the mountings therefor.

A still further object is to provide an attachment which, when applied, will be compact and will occupy but very little space and will present a neat appearance.

Further objects will appear from the detailed description.

In the drawing:

Figure 1 is a top plan view of a crank provided with an attachment constructed in accordance with my invention, as applied.

Fig. 2 is a section taken substantially on line 2—2 of Fig. 1.

Fig. 3 is a perspective side view of the roller carrying member of the releasing attachment.

Fig. 4 is a section taken substantially on line 4—4 of Fig. 1.

The crank designated generally by C is of ordinary construction, being provided at its inner end with a clutch element D secured thereto, the teeth D' of which are directed in a clockwise direction and are adapted for engagement with the clutch pins E projecting radially from the crank shaft F of the engine at diametrically opposite points thereon. This crank is slidable through a flanged bearing nipple G secured by a bearing strap H in a bearing bracket I which is secured by machine bolts J on the radiator supporting frame K, in the usual manner. At its outer end the crank is provided with the usual handle L for manual rotation of the crank. All of these parts so far described are of standard construction and form no part of my invention except in so far as they coöperate with the means to be hereinafter described for accomplishing the desired result.

A cylindrical ratchet casing 1 is mounted about the horizontal or body portion of crank C closely adjacent the outer end of bearing nipple G. The outer end of this casing is open and the peripheral wall of the casing is cut or notched to provide a plurality of ratchet teeth or shoulders 2 which are rather sharply inclined and are directed in a counter-clockwise direction. This casing is provided with an integral arm 3 projecting to one side thereof over one end of the bearing bracket I, this arm being provided adjacent its outer end with an aperture which receives securing bolt J, this bolt and the arm acting to effectually secure the casing against rotation in either direction and to secure it in proper position closely adjacent the bearing member. An expansion coil spring 4 is mounted about the crank and is confined between the inner end of casing 1 and a closure plate or disk 5 secured on the inner end of a drum 6 which is loosely mounted about the crank so as to permit rotation thereof independently of the drum. A roller carrying member 7 is mounted on the crank within drum 6 and is provided with an outwardly projecting sleeve element 8 of arcuate cross section which is of such length as to extend forwardly slightly beyond the inner bend of the curvature in the crank formed at the juncture between the horizontal or body portion thereof and the vertical arm 9 of the crank. By this means the roller carrying member 7 is so secured to the crank as to turn therewith when the crank is turned in either direction. If desired, though not necessarily, the element 8 of this member may be positively secured to the crank by means of a securing screw 10 inserted therethrough and screwed into the crank. As will be noted more clearly from Figs. 2 and 3 of the drawings, member 7 is provided with a plurality of tangentially disposed teeth or arms 11 carried thereby and of such length as to snugly fit the interior of drum 6. These arms are provided with inclined faces 11ª, all of the arms being inclined in a clockwise direction. Gripping rollers 12 are supported loosely by arms 11, these rollers being of such diameter as to fit loosely between the arms at the juncture thereof. Due to the particular relation between arms 11 and the rollers 12, when the crank is rotated in a clockwise direction the rollers will idle about the inner face of drum 6, turning freely and loosely between the arms, as will be clear from Fig. 2. When the crank is turned in reverse direction, however, the inclined faces 11ª of arms 11 will force the rollers outwardly into tight frictional engagement with the inner peripheral surface of drum 6, thus locking the drum and the crank together frictionally and causing rotation of the drum in a counter-clockwise direction. This drum is provided, at diametrically opposite points, with two roller disks 13 rotatably secured on the outer surface thereof by means of pivot screws 14 inserted through the disk rollers and screwed into the drum, as clearly shown in Fig. 2. These disk rollers engage into the notches or recesses 2ª of the ratchet casing 1 when the crank, and consequently the drum 6, is forced inwardly so as to bring the clutch B into engagement with the pins E.

This attachment may be readily applied to a crank for an internal combustion engine, of standard construction, without necessitating any change in the crank or the mounting thereof. When the clutch element of the crank is in engagement with the clutch pins of the crank shaft of the engine, the crank may be freely turned in a clockwise direction, the roller carrying member 7 rotating freely with the crank in drum 6. In the event that the engine back-fires, reverse rotation of the crank will cause rotation of drum 6 in a counter-clockwise direction in the manner above described. This results in forcing the disk rollers 13 into engagement with the inclined shoulders 2 of casing 1, thus forcing the drum and the crank shaft away from the casing so as to quickly disengage the clutch member D from the clutch pins E of the crank shaft F of the engine, thus preventing serious injury to the person cranking the automobile such as frequently occurs in using a crank of ordinary construction not provided with a safety attachment, when the engine back-fires. To insure accuracy of operation, the drum 6 is preferably of such exterior diameter as to fit snugly within the ratchet casing 1 so that the disk rollers 14 are so positioned as to properly engage the inclined faces of shoulders 2 of the casing. The relative diameters between the casing and drum may, however, be varied of course to suit conditions.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. The combination with an engine shaft provided with clutch elements, of a crank shaft mounted for movement toward and away from said engine shaft and provided with a clutch element adapted to engage the clutch elements of said shaft so as to cause rotation thereof when the crank shaft is moved inwardly and turned in one direction, a drum mounted loosely about the crank shaft, means for connecting the drum to the crank shaft for rotation therewith when the crank is turned in the other direction, said means being adapted to permit independent rotation of the crank shaft in such direction as to rotate the engine shaft, the drum being held against outward movement on the crank shaft, and means coöperating with said drum for forcing the drum outwardly when rotated reversely to the direction of rotation of the engine shaft and the crank shaft is in its inner position for rotating said engine shaft.

2. The combination with an engine shaft provided with clutch elements, of a crank shaft movable toward and away from said engine shaft and provided with a clutch element adapted to engage the clutch elements of the engine shaft so as to cause rotation thereof when the crank shaft is moved into its innermost position and turned in one direction, a casing mounted about said crank shaft and secured against movement provided with inclined surfaces directed oppositely to the direction of rotation of the crank shaft when turned to rotate said engine shaft, a drum loosely mounted on the crank shaft and provided with outwardly projecting members adapted to engage the inclined surfaces of said casing, said drum being held against movement longitudinally of the crank shaft, and means carried by the crank shaft and positioned within the drum for permitting independent rotation of the crank shaft in such direction as to rotate the engine shaft while serving to lock the drum to the crank shaft for rotation therewith when the crank shaft is turned in a reverse direction.

3. The combination with an engine shaft provided with a clutch element, of a crank shaft mounted for movement toward and away from said engine shaft and provided with a clutch element for engagement with the clutch element of the engine shaft and having its teeth disposed in one direction, a casing mounted about the crank shaft and secured against movement, said casing being open at its outer end and having its peripheral wall cut to provide inclined shoulders directed oppositely to the teeth of the clutch element of the crank shaft, a drum loosely mounted on the crank shaft in concentric relation to said casing and provided with outwardly projecting members for engagement with the inclined shoulders of the casing, said drum being adapted to fit into said casing when the crank shaft is forced inwardly, a roller carrying member mounted on the crank shaft and positioned within the drum, said member being provided with roller supporting arms each having an inclined surface directed oppositely to the inclination of the shoulders of said casing, said member being secured to the crank shaft for rotation therewith, and gripping rollers loosely supported by said member between the arms thereof and being of such diameter as to frictionally engage said arms and the periphery of the drum upon reverse rotation of the crank shaft.

In testimony whereof I affix my signature in presence of two witnesses.

HENRY L. SCHOLL.

Witnesses:
 IRVING C. KNOOK,
 WILLIAM C. KRUEGER.